United States Patent
Choi et al.

(10) Patent No.: US 7,496,115 B2
(45) Date of Patent: Feb. 24, 2009

(54) APPARATUS FOR MULTIPLEXING GIGABIT ETHERNET FRAME AND APPARATUS FOR DEMULTIPLEXING 10-GIGABIT ETHERNET FRAME

(75) Inventors: Chang Ho Choi, Daejeon (KR); Bheom Soon Joo, Daejeon (KR); Do Yeon Kim, Daejeon (KR); Hae Won Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 934 days.

(21) Appl. No.: 10/835,703

(22) Filed: Apr. 29, 2004

(65) Prior Publication Data
US 2005/0135434 A1 Jun. 23, 2005

(30) Foreign Application Priority Data
Dec. 23, 2003 (KR) ............... 10-2003-0095388

(51) Int. Cl.
*H04J 3/04* (2006.01)
(52) U.S. Cl. ............... 370/535; 370/536; 370/537; 370/540; 370/542
(58) Field of Classification Search ............. 710/310; 370/470, 229, 535, 360, 389, 466
See application file for complete search history.

(56) References Cited

U.S. PATENT DOCUMENTS

| | | | | |
|---|---|---|---|---|
| 6,901,072 | B1 * | 5/2005 | Wong | 370/389 |
| 6,910,092 | B2 * | 6/2005 | Calvignac et al. | 710/310 |
| 7,133,416 | B1 * | 11/2006 | Chamdani et al. | 370/466 |
| 7,298,738 | B1 * | 11/2007 | Parruck et al. | 370/360 |
| 7,308,006 | B1 * | 12/2007 | Banerjee et al. | 370/535 |
| 2004/0008714 | A1 * | 1/2004 | Jones | 370/428 |
| 2004/0228364 | A1 * | 11/2004 | Walker et al. | 370/470 |

FOREIGN PATENT DOCUMENTS

KR 1019940032711 12/1994

(Continued)

OTHER PUBLICATIONS

"Design and Implementation of 10Gigabit Ethernet Frame Multiplexer/Demultiplexer", IEEK Summer Conference 2003, p. 1-13.

*Primary Examiner*—Fan Tsang
*Assistant Examiner*—Simon King
(74) *Attorney, Agent, or Firm*—Blakely, Sokoloff, Taylor & Zafman LLP (57) ABSTRACT

Provided are an apparatus for multiplexing Gigabit Ethernet frames and an apparatus for demultiplexing 10-Gigabit Ethernet frames. The apparatus for multiplexing Gigabit Ethernet frames includes at least one pre-processing unit, a multiplexing unit, an SDR/DDR conversion unit, and a control unit. The at least one pre-processing unit receives Gigabit Ethernet frames, converts the Gigabit Ethernet frames into 10-Gigabit Ethernet frames, and outputs the 10-Gigabit Ethernet frames. The multiplexing unit receives the 10-Gigabit Ethernet frames, time division multiplexes the 10-Gigabit Ethernet frames in frame units, and outputs the time division multiplexed 10-Gigabit Ethernet frames as first data. The SDR/DDR conversion unit, which converts the first data into second data having two 32-bit bus structures and outputs the second data. The control unit outputs a first control signal in response to an output request of the pre-processing unit.

7 Claims, 7 Drawing Sheets

FOREIGN PATENT DOCUMENTS

| | | |
|---|---|---|
| KR | 960070593 | 12/1996 |
| KR | 970018092 | 5/1997 |
| KR | 980043402 | 10/1998 |
| KR | 990030621 | 7/1999 |
| KR | 990058326 | 12/1999 |
| KR | 990059025 | 12/1999 |
| KR | 990060614 | 12/1999 |
| KR | 000011609 | 3/2000 |
| KR | 1020010058765 | 9/2001 |
| KR | 1020030089748 A | 11/2003 |

* cited by examiner

S : Start control character
T : Terminate control character
Dp : preamble Data octet
I : Idle control character
SFD : Start of Frame Delimiter

APPARATUS FOR MULTIPLEXING GIGABIT ETHERNET FRAME AND APPARATUS FOR DEMULTIPLEXING 10-GIGABIT ETHERNET FRAME

CROSS REFERENCE TO RELATED APPLICATION

This application claims the priority of Korean Patent Application No. 2003-95388, filed on Dec. 23, 2003, in the Korean Intellectual Property Office, the disclosure of which is herein in its entirety incorporated by reference.

BACKGROUND OF THE INVENTION

1. Field of the Invention

The present invention relates to an apparatus for multiplexing Gigabit Ethernet frames to provide 10-Gigabit Ethernet interface by multiplexing Gigabit Ethernet frames input from multi-port Gigabit Ethernet MAC (Medium Access Control) and for demultiplexing 10-Gigabit Ethernet frame to provide Gigabit Ethernet interface to the multi-port Gigabit Ethernet MAC by demultiplexing the 10-Gigabit Ethernet frame.

2. Description of the Related Art

Since Ethernet frames are not fixed-length cells used in asynchronous transfer mode (ATM) but have variable lengths ranging from 64 bytes to 1,518 bytes, fixed time slots cannot be used during a multiplexing procedure from a low data rate to a high data rate. Also, bit-based time division multiplexing (TDM) is considered, but when multiplexing is performed using bit-based TDM, it is difficult to synchronize frames and the multiplexed frames cannot maintain an Ethernet frame configuration, resulting in incompatibility with other Ethernet devices. Thus, multiplexing in conventional Ethernet devices have mainly used link aggregation in a MAC zone or wave division multiplexing (WDM) in which various waves are used in one optical fiber.

In general, to process 10-Gigabit Ethernet frames, 10-Gigabit network processor and 10-Gigabit Ethernet MAC are required. Since the 10-Gigabit network processor has not been commercialized yet, it is necessary to actually perform Gigabit processing and provide 10-Gigabit interface by inserting frame multiplexing/demultiplexing circuits into already commercialized Gigabit network processor and Gigabit Ethernet MAC. Thus, it becomes possible to provide 10-Gigabit Ethernet interface without using 10-Gigabit network processor and the amount of transmission can be increased to 10 times Gigabit Ethernet by using one optical fiber instead of a plurality of optical fibers for 10-Gigabit bandwidths. Also, since Ethernet frames have variable lengths ranging from 64 bytes to 1,518 bytes, when using the Ethernet frames in conventional cell-based multiplexing, there are many problems such as framing, synchronization, bit-based TDM, and the like.

SUMMARY OF THE INVENTION

The present invention provides an apparatus for multiplexing Gigabit Ethernet frames to provide 10-Gigabit Ethernet interface to a 10-Gigabit physical layer by multiplexing Gigabit Ethernet frames input from multi-port Gigabit Ethernet MAC and an apparatus for demultiplexing 10-Gigabit Ethernet frames to provide Gigabit Ethernet interface to the multi-port Ethernet MAC by demultiplexing 10-Gigabit Ethernet frames input from the 10-Gigabit physical layer.

According to an aspect of the present invention, there is provided an apparatus for multiplexing Ethernet frames, the apparatus comprising: at least one pre-processing unit, which receives Gigabit Ethernet frames, converts the Gigabit Ethernet frames into 10-Gigabit Ethernet frames, and outputs the 10-Gigabit Ethernet frames; a multiplexing unit, which receives the 10-Gigabit Ethernet frames, time division multiplexes the 10-Gigabit Ethernet frames in frame units, and outputs the time division multiplexed 10-Gigabit Ethernet frames as first data; an SDR/DDR conversion unit, which converts the first data into second data having two 32-bit bus structures and outputs the second data; and a control unit, which outputs a first control signal in response to an output request of the pre-processing unit.

According to another aspect of the present invention, there is provided an apparatus for demultiplexing 10-Gigabit Ethernet frames, the apparatus comprising: a DDR/SDR conversion unit, which receives 10-Gigabit Ethernet frames, converts the 10-Gigabit Ethernet frames into 10-Gigabit Ethernet frames having a 64-bit bus structure, and outputs the Gigabit Ethernet frames as first data; a demultiplexing unit, which demultiplexes the first data in frame units according to a first control signal and outputs the demultiplexed first data to a post-processing unit; at least one post-processing unit, which converts the demultiplexed first data into Gigabit Ethernet frames having a 8-bit bus structure, and outputs the Gigabit Ethernet frames having the 8-bit bus structure; and a demultiplexing control unit, which outputs the first control signal using a round robin scheme, so that the demultiplexed Gigabit Ethernet frames can be sequentially input to the post-processing unit.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 1:
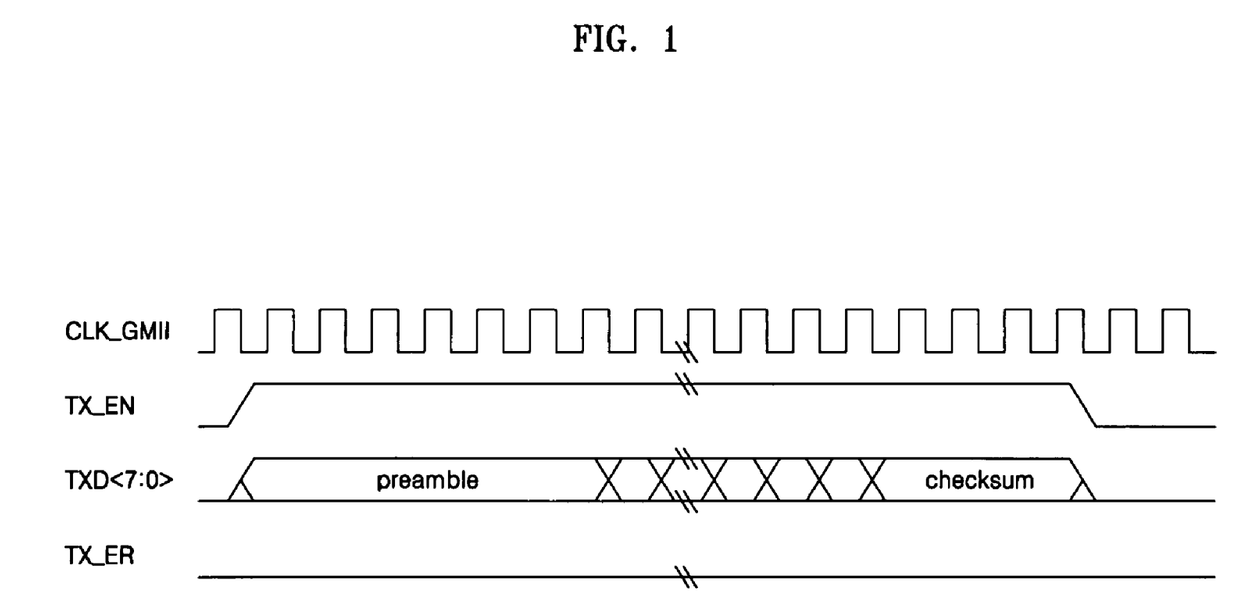
FIG. 1 is a timing diagram of Gigabit media independent interface (GMII) standardized in IEEE802.3z.

The present invention will now be described more fully with reference to the accompanying drawings, in which an embodiment of the invention is shown. Throughout the drawings, like reference numerals are used to refer to like elements. Hereinafter, timing diagrams for input/output operations of an apparatus for multiplexing Gigabit Ethernet frames and an apparatus for demultiplexing 10-Gigabit Ethernet frames will be described. FIG. 1 is a timing diagram of GMII standardized in IEEE802.3z and FIG. 2 is a timing diagram of XGMII standardized in IEEE802.3ae.

As shown in FIG. 1, GMII standardized in IEEE802.3z is composed of a 125 MHz clock CLK_GMII, a frame data enable signal TX_EN, an error signal TX_ER, and frame data TXD<7:0>. To provide transmission rate of giga-bits per second, the frame data has 8-bit parallel configuration.

Figure 2:
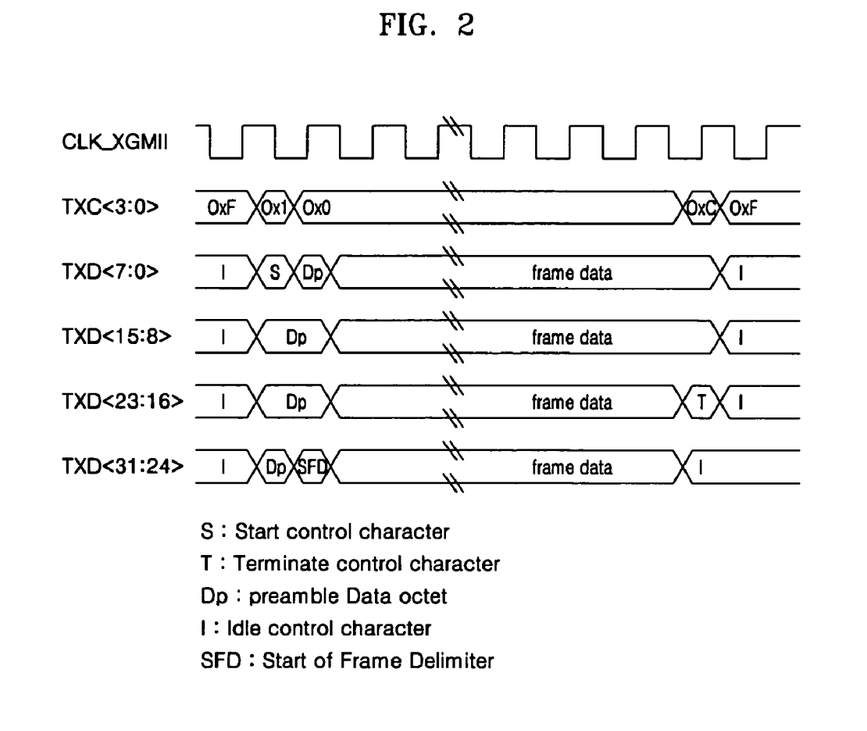
FIG. 2 is a timing diagram of 10-Gigabit media independent interface (XGMII) standardized in IEEE802.3ae.

As shown in FIG. 2, XGMII standardized in IEEE802.3ae is composed of a 156.25 MHz clock CLK_XGMII, a 4-bit frame data control signal TXC<3:0> corresponding to each lane, and 32-bit frame data TXD<31:0>. The 32-bit frame data TXD<31:0> is divided into 8-bit sections for respective lanes and classified into S (start control character), T (terminate control character), Dp (preamble data octet), I (idle control character), SFD (start of frame delimiter), and general data according to a type of combination with the frame data control signal TXC<3:0>. Also, a 10-Gigabit data transmission rate per second is supported using a double data rate (DDR) technique in which frame data conversion occurs at the falling edge and the rising edge of the 156.25 MHz clock.

Figure 3:
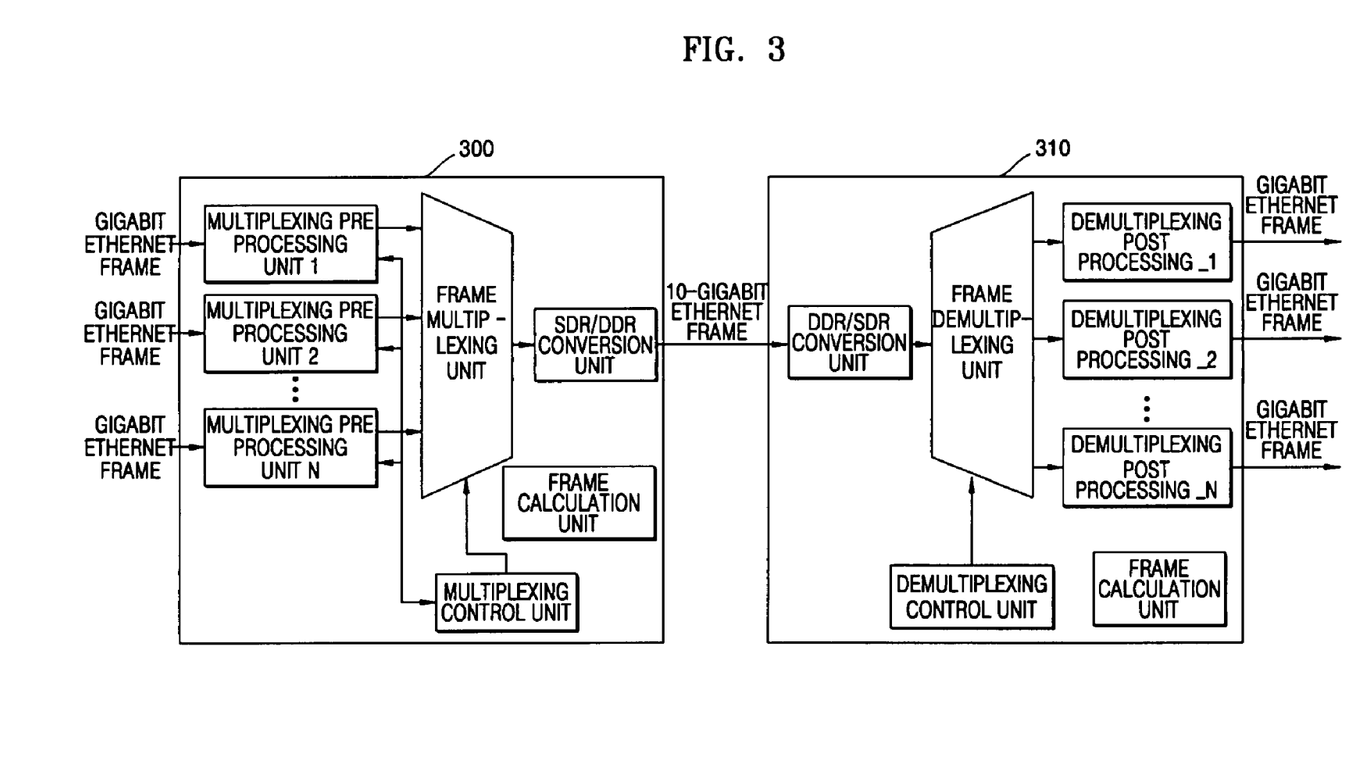
FIG. 3 is a diagram of a system in which an apparatus for multiplexing Gigabit Ethernet frames and an apparatus for demultiplexing 10-Gigabit Ethernet frames are combined according to the present invention.

Hereinafter, an embodiment of an apparatus for multiplexing Gigabit Ethernet frames and an apparatus for demultiplexing 10-Gigabit Ethernet frames will be described. FIG. 3 is a diagram of a system in which the the apparatus for multiplexing Gigabit Ethernet frames and the apparatus for demultiplexing 10-Gigabit Ethernet frames are combined. The system will be roughly described with reference to FIG. 3 and then will be described in detail later.

Gigabit Ethernet frames input from multi-port Gigabit MAC are multiplexed into 10-Gigabit Ethernet frames by an apparatus 300 for multiplexing Gigabit Ethernet frames and are then transmitted. At a receipt terminal that operates inversely to the apparatus 300, input 10-Gigabit Ethernet frames are speed-converted into Gigabit Ethernet frame by an apparatus 310 for demultiplexing 10-Gigabit Ethernet frames and are then transmitted to the multi-port Gigabit Ethernet MAC.

Figure 4:
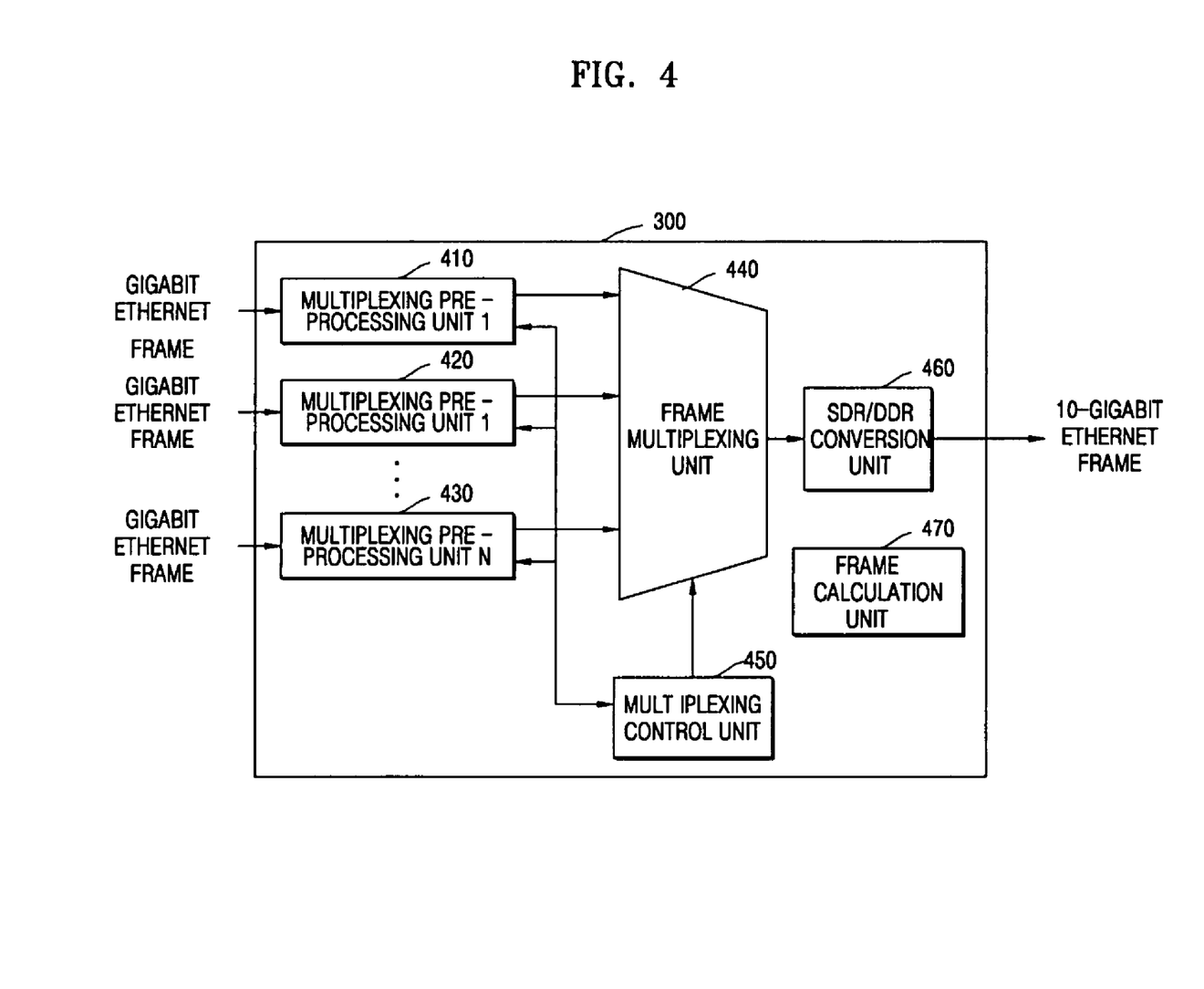
FIG. 4 is a block diagram of an apparatus for multiplexing Gigabit Ethernet frames according to the present invention.
Figure 5:
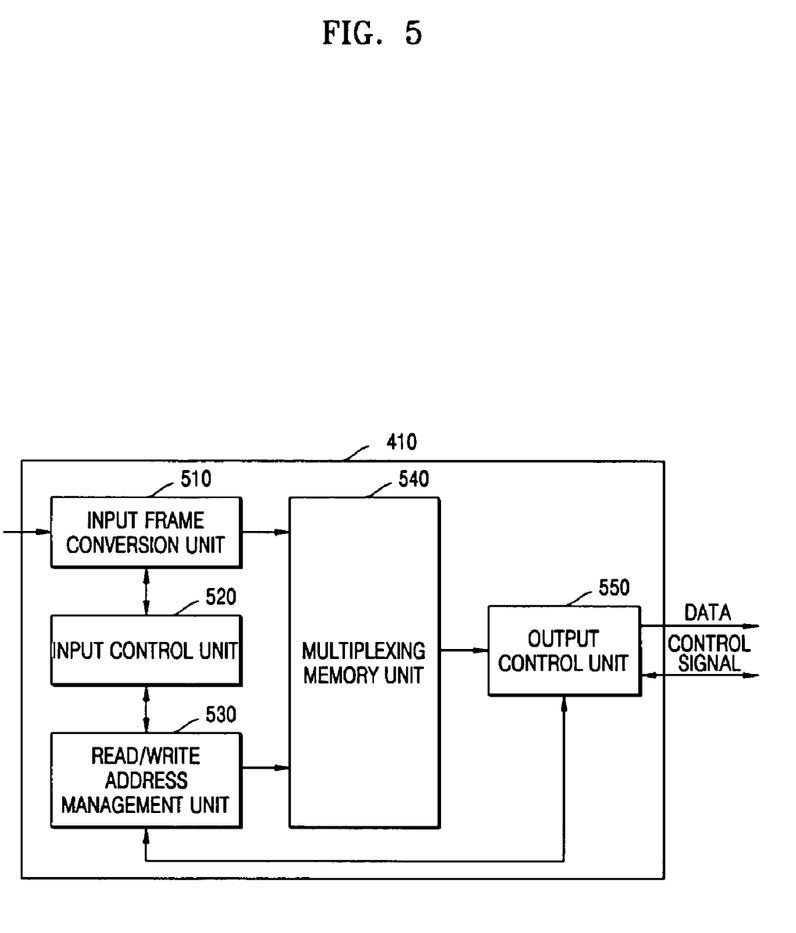
FIG. 5 is a detailed block diagram of multiplexing pre-processing units of the apparatus of FIG. 4.

Hereinafter, an embodiment of the apparatus 300 will be described with reference to FIGS. 4 and 5. FIG. 4 is a block diagram of the apparatus 300 according to the present invention, and FIG. 5 is a detailed block diagram of multiplexing pre-processing units of the apparatus of FIG. 4.

Signal output terminals of the multiplexing pre-processing units 410, 420, and 430 configured in parallel are connected to signal input terminals of a frame multiplexing unit 440, a signal output terminal of a multiplexing control unit 450 is connected to a signal input terminal of the frame multiplexing unit 440, and a signal output terminal of the frame multiplexing unit 440 is connected to a signal input terminal of a SDR/DDR conversion unit 460.

Gigabit Ethernet frames input from an N-port Gigabit MAC are converted into 10-Gigabit Ethernet frames by the multiplexing pre-processing units 410, 420, and 430 and the 10-Gigabit Ethernet frames are input to the frame multiplexing unit 440 in frame units according to a control signal of the multiplexing control unit 450. The multiplexing pre-processing units 410, 420, and 430 convert the input Gigabit Ethernet frames into the 10-Gigabit Ethernet frames and store the 10-Gigabit Ethernet frames in a multiplexing memory unit 549, and send output request signals to the multiplexing control unit 450 upon completion of the storage. As a result, a number of output request signals may be simultaneously input to the multiplexing control unit 450.

To prevent such possible collisions among the output request signals, the multiplexing control unit 450 checks if the output request signals are generated by the multiplexing pre-processing units 410, 420, and 430 using a round robin scheme and sends output permit signals to the multiplexing pre-processing units 410, 420, and 430. For example, if the number of multiplexing pre-processing units is 10, the multiplexing control unit 450 assigns numbers 1 to 10 to multiplexing pre-processing units.

The multiplexing control unit 450 checks whether a output request exists in the output request signal of the multiplexing pre-processing unit 410 having the number 1 or not, and sends the output permit signal to the multiplexing pre-processing unit 410 having the number 1 if the output request is detected. After completion of frame output from the multiplexing pre-processing unit 410 having the number 1, the multiplexing control unit 450 checks whether a output request exists in the output request signal of the multiplexing pre-processing unit 420 having the number 2 or not, sends the output permit signal to the multiplexing pre-processing unit 420 having the number 2 if the output request from the multiplexing pre-processing unit 420 having the number 2 is detected, and checks whether a output request exists in the output request signal of the multiplexing pre-processing unit 430 having the number 3 or not if the output request from the multiplexing pre-processing unit 420 having the number 2 is not detected. This procedure is repeated until the output request signals of the entire multiplexing pre-processing units are checked. At this time, the output request signals of the multiplexing pre-processing units 410, 420, and 430 hold values '1' until the output permit signals are received and frame output is completed. After frame output is completed, the values '1' transit to '0'. Thus, even when the output request signals are generated by 10 multiplexing pre-processing units, there is no possibility of simultaneous output of more than two frames.

The 10-Gigabit Ethernet frames output by the multiplexing pre-processing units 410, 420, and 430 are time division multiplexed in frame units by the frame multiplexing unit 440, processed by the SDR/DDR conversion unit 460, and transmitted to a 10-Gigabit Ethernet physical layer and an optical module (not shown) at a transmission terminal. Here, frame data input as a 64-bit bus structure to the front terminal of the SDR/DDR conversion unit 460 are converted into two 32-bit bus structures at the rising edge and the falling edge of the 156.25 MHz clock and are then output.

A frame calculation unit 470 of the apparatus 300 calculates the number of Gigabit Ethernet frames input to the multiplexing pre-processing units 410, 420, and 430, the number of 10-Gigabit Ethernet frames that are output as conversions of the Gigabit Ethernet frames, the number of 10-Gigabit Ethernet frames input to the frame multiplexing unit 440, and the number of 10-Gigabit Ethernet frames output from the frame multiplexing unit 440. Results of calculation are used for debugging and statistical data.

Hereinafter, the function of the multiplexing pre-processing unit 410 will be described in detail with reference to FIG. 5. A signal output terminal of an input frame conversion unit 510 is connected to a signal input terminal of a multiplexing memory unit 540, a signal output terminal of an input control unit 520 is connected to signal input terminals of the input frame conversion unit 510 and a read/write address management unit 530. A signal output terminal of the read/write address management unit 530 is connected to the signal input terminal of the multiplexing memory unit 540, a signal output terminal of the multiplexing memory unit 540 is connected to a signal input unit of an output control unit 550, and a signal output terminal of the output control unit 550 is connected to the signal input terminal of the read/write address management unit 530.

The input frame conversion unit 510 converts the Gigabit Ethernet frames input having the 8-bit bus structure into the 10-Gigabit Ethernet frames having a 64-bit bus structure and stores the 10-Gigabit Ethernet frames in the multiplexing unit 540. The input control unit 520 monitors the start and end of the input Gigabit Ethernet frames and informs the input frame conversion unit 510 of the start and end of the input Gigabit Ethernet frames. Also, the input control unit 520 creates a write enable signal to store the 10-Gigabit Ethernet frames having the 64-bit bus structure in the multiplexing memory unit 540 and directs read/write address management unit 530 to create a write address according to the created write enable signal.

After completion of conversion and storage of the Gigabit Ethernet frames, the output control unit 550 sends the output request signal to the multiplexing control unit 450 to output the 10-Gigabit Ethernet frames stored in the multiplexing memory unit 540 to the frame multiplexing unit 440, creates a read enable signal upon receipt of the output permit signal from the multiplexing control unit 450, directs the read/write address management unit 530 to create a read address, and outputs the 10-Gigabit Ethernet frames stored in the multiplexing memory unit 540 to the frame multiplexing unit 440 in synchronization with the 156.25 MHz clock. At this time, if the output permit signal is not applied to the output control unit 550, the output control unit 550 remains in an output request state. Preferably, the number of multiplexing pre-processing units, i.e., N ranges from 8 to 12 in consideration of characteristic and transmission rate of the system.

Figure 6:
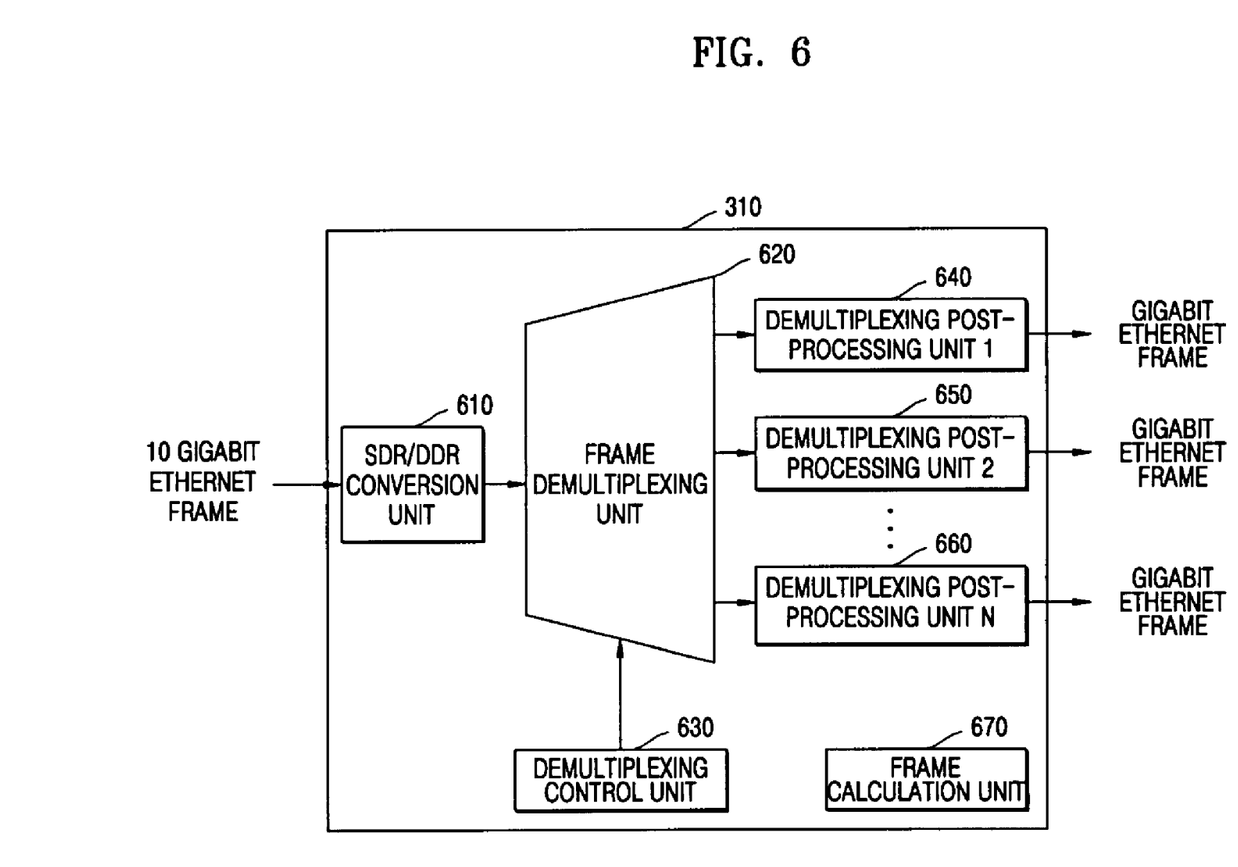
FIG. 6 is a block diagram of an apparatus for demultiplexing 10-Gigabit Ethernet frames according to the present invention.
Figure 7:
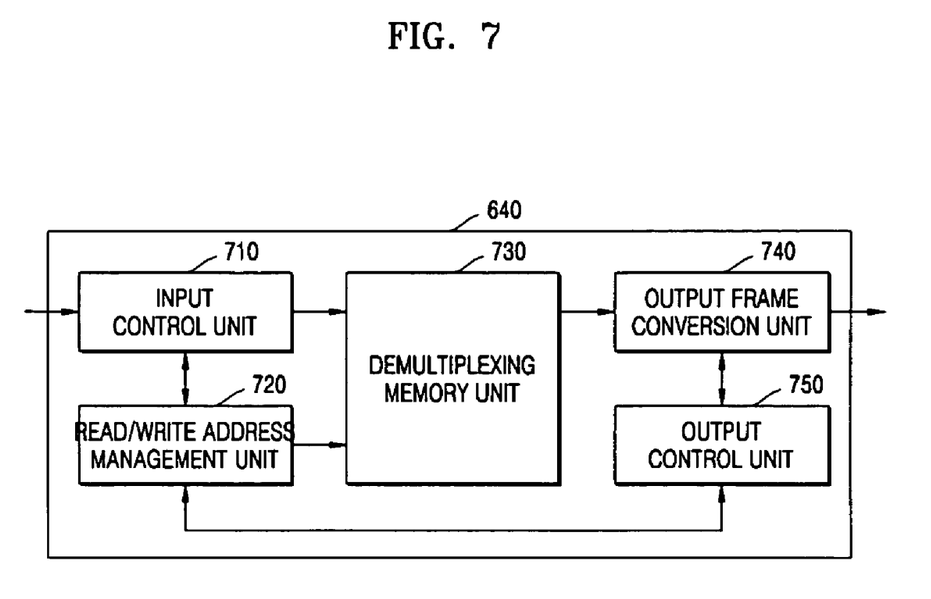
FIG. 7 is a detailed block diagram of demultiplexing post-processing units of the apparatus of FIG. 6.

Hereinafter, an embodiment of the apparatus 310 will be described in detail with reference to FIGS. 6 and 7. A signal output terminal of a DDR/SDR conversion unit 610 is connected to a signal input terminal of a frame demultiplexing unit 620, a signal output terminal of a demultiplexing control unit 630 is connected to a signal input terminal of a frame demultiplexing unit 620, and a signal output terminal of the frame demultiplexing unit 620 is connected to demultiplexing post-processing units 640, 650, and 660 that are arranged in parallel. The DDR/SDR conversion unit 610 converts 10-Gigabit Ethernet frames that are input through XGMII and have a DDR 32-bit bus structure into Gigabit Ethernet frames having a SDR 64-bit bus structure and transmits the Gigabit Ethernet frames to the frame demultiplexing unit 620.

The frame demultiplexing unit 620 demultiplexes the input 10-Gigabit Ethernet frames to the demultiplexing post-processing units 640, 650, and 660. The demultiplexing control unit 630 designates output ports using the round robin scheme, so that frames demultiplexed by the frame demultiplexing unit 620 can be sequentially transmitted to the demultiplexing post-processing units 640, 650, and 660 that are arranged in parallel. In other words, the frame demultiplexig unit 620 transmits the first input 10-Gigabit Ethernet frame to the first demultiplexing post-processing unit 640 and then transmits the next input frame to the second demultiplexing unit 650. Thus, it is possible to prevent a series of 10-Gigabit Ethernet frames from being concentrated on one demultiplexing post-processing unit. If a series of 10-Gigabit Ethernet frames is concentrated on a specific demultiplexing post-processing unit, new 10-Gigabit Ethernet frames are accumulated in a demultiplexing memory unit 730 of the specific demultiplexing post-processing unit before 10-Gigabit Ethernet frames that are previously stored in the demultiplexing memory unit 730 are speed converted into Gigabit Ethernet frames and are then output, resulting in data loss due to overflow. Thus, it is necessary to prevent concentration of frames on one demultiplexing post-processing unit.

A frame calculation unit 670 of the apparatus 310 calculates the number of 10-Gigabit Ethernet frames input to the frame demultiplexing unit 620, the number of 10-Gigabit Ethernet frames that are demultiplexed and then output, the number of 10-Gigabit Ethernet frames input to the demultiplexing post-processing units 640, 650, and 660, and the number of Gigabit Ethernet frames that are speed converted and then output. Results of calculation are used for debugging and statistical data.

Hereinafter, the function of the demultiplexing post-processing unit 640 will be described in detail with reference to FIG. 7. A signal output terminal of an input control unit 710 is connected to a signal input terminal of a read/write address management unit 720 of a demultiplexing memory unit 730, a signal output terminal of the read/write address management unit 720 is connected to a signal input terminal of the demultiplexing memory unit 730, a signal output terminal of an output control unit 750 is connected to the read/write address management unit 720 and an output frame conversion unit 740, and a signal output terminal of the demultiplexing memory unit 730 is connected to a signal input terminal of the output frame conversion unit 740.

The input control unit 710 monitors the start and end of the demultiplexed 10-Gigabit Ethernet frames, creates a write enable signal to store the 10-Gigabit Ethernet frame having the 64-bit bus structure in the demultiplexing memory unit 730, and directs the read/write address management unit 720 to create a write address according to the write enable signal. After completion of the storage of the demultiplexed 10-Gigabit Ethernet frames, the output control unit 750 creates a read enable signal, directs the read/write address management unit 720 to create a read address, and activates the read enable signal at '1' until conversion of one 10-Gigabit Ethernet frame into a Gigabit Ethernet frame is completed in the output frame conversion unit 740. The output frame conversion unit 740 receives the 10-Gigabit Ethernet frames having the 64-bit bust structure from the demultiplexing memory unit 730, converts the 10-Gigabit Ethernet frames into Gigabit Ethernet frames having the 8-bit bus structure, and then outputs the Gigabit Ethernet frames.

As described above, the apparatus for multiplexing Gigabit Ethernet frames and the apparatus for demultiplexing 10-Gigabit Ethernet frames according to the present invention adopt frame-based time division multiplexing/demultiplexing and use independent multiplexing pre-processing units and demultiplexing post-processing units that are arranged in parallel, thereby performing multiplexing and demultiplexing of Ethernet frames regardless of frame synchronization and length. Also, since 10-Gigabit Ethernet interface can be provided using conventionally commercialized Gigabit network processors instead of 10-Gigabit network processors, the apparatus for multiplexing Gigabit Ethernet frames and the apparatus for demultiplexing 10-Gigabit Ethernet frames according to the present invention can gain an advantage in terms of cost competitiveness and can be used for 10-Gigabit Ethernet frame transmission methods until 10-Gigabit network processors are commercialized.

While the present invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

What is claimed is:

1. An apparatus for multiplexing Ethernet frames, the apparatus comprising:
a plurality of parallel pre-processing units, which receive Gigabit Ethernet frames, convert the Gigabit Ethernet frames into 10-Gigabit Ethernet frames, and output the 10-Gigabit Ethernet frames;

a multiplexing unit, which receives the 10-Gigabit Ethernet frames, time division multiplexes the 10-Gigabit Ethernet frames in frame units, and outputs the time division multiplexed 10-Gigabit Ethernet frames as first data;

an SDR/DDR conversion unit, which converts the first data into second data having two 32-bit bus structures and outputs the second data; and a control unit, which outputs a first control signal in response to an output request of one of the pre-processing units, wherein the one of the parallel pre-processing units receives the output request for a 10-Gigabit Ethernet frame according to the first control signal and each of the parallel pre-processing units send the 10-Gigabit Ethernet frames to the multiplexing unit, without synchronization between the 10-Gigabit Ethernet frames that are output from each parallel pre-processing unit.

2. The apparatus of claim 1, wherein the control unit processes the output request of the pre-processor using a round robin scheme and outputs the first control signal.

3. The apparatus of claim 1, wherein the pre-processing unit comprises:

an input frame conversion unit, which converts the input Gigabit Ethernet frames having a 8-bit bus structure into a 64-bit bus structure;

an input control unit, which creates a write enable signal to store the Gigabit Ethernet frames having the 64-bit bus structure in a memory unit according to the start and end of the input Gigabit Ethernet frames;

an output control unit, which sends an output request of the Gigabit Ethernet frames that are stored in the memory unit to the control unit and creates a read enable signal according to a response to the output request;

a read/write address management unit, which creates a write address and a read address according to the write enable signal and the read enable signal to control the memory unit; and a memory unit, which stores the Gigabit Ethernet frames having the 64-bit bus structure and outputs the Gigabit Ethernet frames having the 64-bit bus structure according to control of the read/write address management unit.

4. The apparatus of claim 1, further comprising a frame calculation unit that calculates the number of frames input to and output from the pre-processing unit and the number of frames input to and output from the multiplexing unit.

5. An apparatus for demultiplexing 10-Gigabit Ethernet frames, the apparatus comprising:

a DDR/SDR conversion unit, which receives 10-Gigabit Ethernet frames, converts the 10-Gigabit Ethernet frames into 10-Gigabit Ethernet frames having a 64-bit bus structure, and outputs the Gigabit Ethernet frames as first data;

a demultiplexing unit, which demultiplexes the first data in frame units according to a first control signal and outputs the demultiplexed first data to a post-processing unit;

a plurality of parallel postprocessing units, which convert the demultiplexed first data into Gigabit Ethernet frames having a 8-bit bus structure, and outputs the Gigabit Ethernet frames having the 8-bit bus structure; and a demultiplexing control unit, which outputs the first control signal using a round robin scheme, so that the demultiplexed Gigabit Ethernet frames can be sequentially input to the post-processing unit.

6. The apparatus of claim 5, wherein the post-processing unit comprises:

an input control unit, which creates a write enable signal to store the Gigabit Ethernet frames having the 64-bit bus structure in a memory unit according to the start and end of the first data;

an output control unit, which creates a read enable signal to output the Gigabit Ethernet frames stored in the memory unit to an output frame conversion unit;

a read/write address management unit, which creates a write address and a read address according to the write enable signal and the read enable signal to control the memory unit; and an output frame conversion unit, which converts the Gigabit Ethernet frames output from the memory unit into Gigabit Ethernet frames having a 8-bit bus structure and outputs the Gigabit Ethernet frames having the 8-bit bus structure.

7. The apparatus of claim 6, further comprising a frame calculation unit that calculates the number of frames input to and output from the demultiplexing unit and the number of frames input to and output from the post-processing unit.

* * * * *